United States Patent
Kuroki et al.

(10) Patent No.: US 9,075,628 B2
(45) Date of Patent: Jul. 7, 2015

(54) ELECTRONIC SYSTEM AND COMMUNICATION CONTROL METHOD FOR TRANSMITTING AND RECEIVING DATA BY SERIAL COMMUNICATION

(71) Applicant: CANON KABUSHIKI KAISHA, Tokyo (JP)

(72) Inventors: Kenji Kuroki, Toride (JP); Keita Takahashi, Abiko (JP); Satoru Yamamoto, Noda (JP); Takuya Hayakawa, Koshigaya (JP); Kuniyasu Kimura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/972,765

(22) Filed: Aug. 21, 2013

(65) Prior Publication Data
US 2014/0056336 A1    Feb. 27, 2014

(30) Foreign Application Priority Data

Aug. 23, 2012 (JP) ................. 2012-184481

(51) Int. Cl.

| | |
|---|---|
| G06F 3/00 | (2006.01) |
| G06F 9/44 | (2006.01) |
| H04L 7/027 | (2006.01) |
| G06F 13/38 | (2006.01) |
| G06F 13/40 | (2006.01) |
| G06F 13/42 | (2006.01) |
| H04L 7/033 | (2006.01) |
| H04L 5/14 | (2006.01) |

(52) U.S. Cl.
CPC .............. *G06F 9/4411* (2013.01); *H04L 7/027* (2013.01); *H04L 7/033* (2013.01); *H04L 5/1423* (2013.01); *G06F 13/385* (2013.01); *G06F 13/4045* (2013.01); *G06F 13/426* (2013.01)

(58) Field of Classification Search
CPC ..... G06F 9/4411; G06F 13/385; H04L 7/027; H04L 7/033; H04L 15/1423
See application file for complete search history.

(56) References Cited

U.S. PATENT DOCUMENTS

| | | |
|---|---|---|
| 6,349,389 B1 | 2/2002 | Sekiya et al. |
| 6,834,321 B2 | 12/2004 | Yokoyama |
| 2005/0080935 A1* | 4/2005 | Fukae et al. ............... 710/1 |
| 2011/0078336 A1* | 3/2011 | Radke et al. .............. 710/10 |
| 2011/0310942 A1* | 12/2011 | Flynn et al. ............. 375/220 |

FOREIGN PATENT DOCUMENTS

| | | |
|---|---|---|
| JP | 5-136898 A | 6/1993 |
| JP | 7-212432 A | 8/1995 |
| JP | 2012-124618 A | 6/2012 |
| WO | WO03/009533 A | 1/2003 |

* cited by examiner

*Primary Examiner* — Leon-Viet Nguyen
(74) *Attorney, Agent, or Firm* — Canon USA, Inc., IP Division (57) ABSTRACT

Provided is an electronic system capable of dynamically switching a communication speed among a plurality of electronic devices connected in series. A first communication device and a second communication device are connected in series to a host controller. After controlling the communication speed of the second communication device to be a communication speed defined in advance, the host controller controls the communication speed of the first communication device to be the same communication speed as the communication speed of the second communication device.

6 Claims, 7 Drawing Sheets

| ID | TRANSMISSION DESTINATION, TRANSMISSION SOURCE |
|---|---|
| 00h | HOST CONTROLLER |
| 01h | FIRST COMMUNICATION DEVICE |
| 02h | SECOND COMMUNICATION DEVICE |

FIG. 3

| COMMAND ID | CONTENTS OF COMMAND | DIRECTION |
|---|---|---|
| 00h | INITIALIZATION REQUEST | HOST CONTROLLER →DEVICE |
| 10h | PLL SETTING REQUEST | HOST CONTROLLER →DEVICE |
| 20h | PLL SWITCHING REQUEST | HOST CONTROLLER →DEVICE |
| 40h | PORT INFORMATION ACQUISITION REQUEST | HOST CONTROLLER →DEVICE |
| E0h | REQUEST SUCCESS RESPONSE | DEVICE→ HOST CONTROLLER |
| E1h | PORT INFORMATION ACQUISITION SUCCESS RESPONSE | DEVICE→ HOST CONTROLLER |
| F0h | REQUEST FAILURE RESPONSE | DEVICE→ HOST CONTROLLER |

ELECTRONIC SYSTEM AND COMMUNICATION CONTROL METHOD FOR TRANSMITTING AND RECEIVING DATA BY SERIAL COMMUNICATION

FIELD OF THE INVENTION

The present invention relates to an electronic system including an electronic device, such as a plurality of microprocessors, integrated circuits (ICs), or an electronic apparatus equipped therewith. In particular, the present invention relates to an electronic system for transmitting/receiving data by serial communications to/from another electronic device connected thereto in series.

BACKGROUND OF THE INVENTION

Some electronic systems are configured by connecting a plurality of electronic devices that can transmit/receive data by serial communications in series to an electronic device being a host controller. In such electronic systems, for example, a plurality of electronic devices being communication counterparts are connected to a serial communication signal line of one communication channel, and communications are performed while switching the electronic devices being the communication counterparts. In order to clarify the communication counterpart, a chip select signal line (CS signal line) may be provided separately from the serial communication signal line. However, in this case, the signal line increases in number, and the configuration of the electronic system becomes complicated.

Therefore, packet communications, which use a packet obtained by adding identification information for identifying the communication counterpart to data to specify the communication counterpart, are effective. In the packet communications, for example, in the electronic system in which two electronic devices are connected in series to the host controller, in order to transmit a packet to the electronic device located at a subsequent stage, the electronic device located at a previous stage relays the packet. Therefore, it is possible to build the electronic system that suppresses the number of signal lines and a signal wire length to a minimum.

U.S. Pat. No. 6,349,389 discloses a communication system configured by a slave relay station for receiving a serial communication signal which is connected to a host controller and another slave relay station further connected in series to the slave relay station. In this system, the host controller can communicate to/from each of the slave relay stations in a transparent manner.

U.S. Pat. No. 6,834,321 discloses a control system in which a plurality of electronic devices are connected in series to a host controller. When receiving a packet that is not addressed to itself, each of the electronic devices switches an input signal and relays the packet to another electronic device connected to the subsequent stage.

The electronic system in which the plurality of electronic devices are thus connected in series to the host controller can be configured with a small number of signal lines and a short signal line length.

In the electronic system in which the plurality of electronic devices are connected in series to the host controller, a frame including at least one packet is relayed to the electronic device being the communication counterpart in order from the electronic device close to the host controller to the electronic device being the communication counterpart. A frame transmitted from the electronic device being the communication counterpart to the host controller is also relayed by the electronic device located therebetween.

In order to establish communications between the respective electronic devices, the communications need to be performed at the same communication speed. Therefore, if the electronic device for relaying the frame changes the communication speed, the communications cannot be performed because the communication speed differs between the electronic devices. With the conventional configuration, the communication speed cannot be switched dynamically.

SUMMARY OF THE INVENTION

An electronic system according to one embodiment of the present invention is a system including a first device, a second device, and a third device that are connected in series via communication lines. The electronic system includes a first communication line for connecting the first device to the second device and a second communication line for connecting the second device to the third device. The first device transmits a command for changing a communication speed to a first speed to the third device via the second device. The first device transmits, after the communication speed of the third device is changed, the command for changing the communication speed to the first speed to the second device. The first device changes, after the communication speed of the second device is changed, the communication speed of the first device to the first speed.

Further features of the present invention will become apparent from the following description of exemplary embodiments (with reference to the attached drawings).

DESCRIPTION OF THE EMBODIMENTS

In the following, an embodiment is described in detail with reference to the accompanying drawings.

(Overall Configuration)

Figure 1:
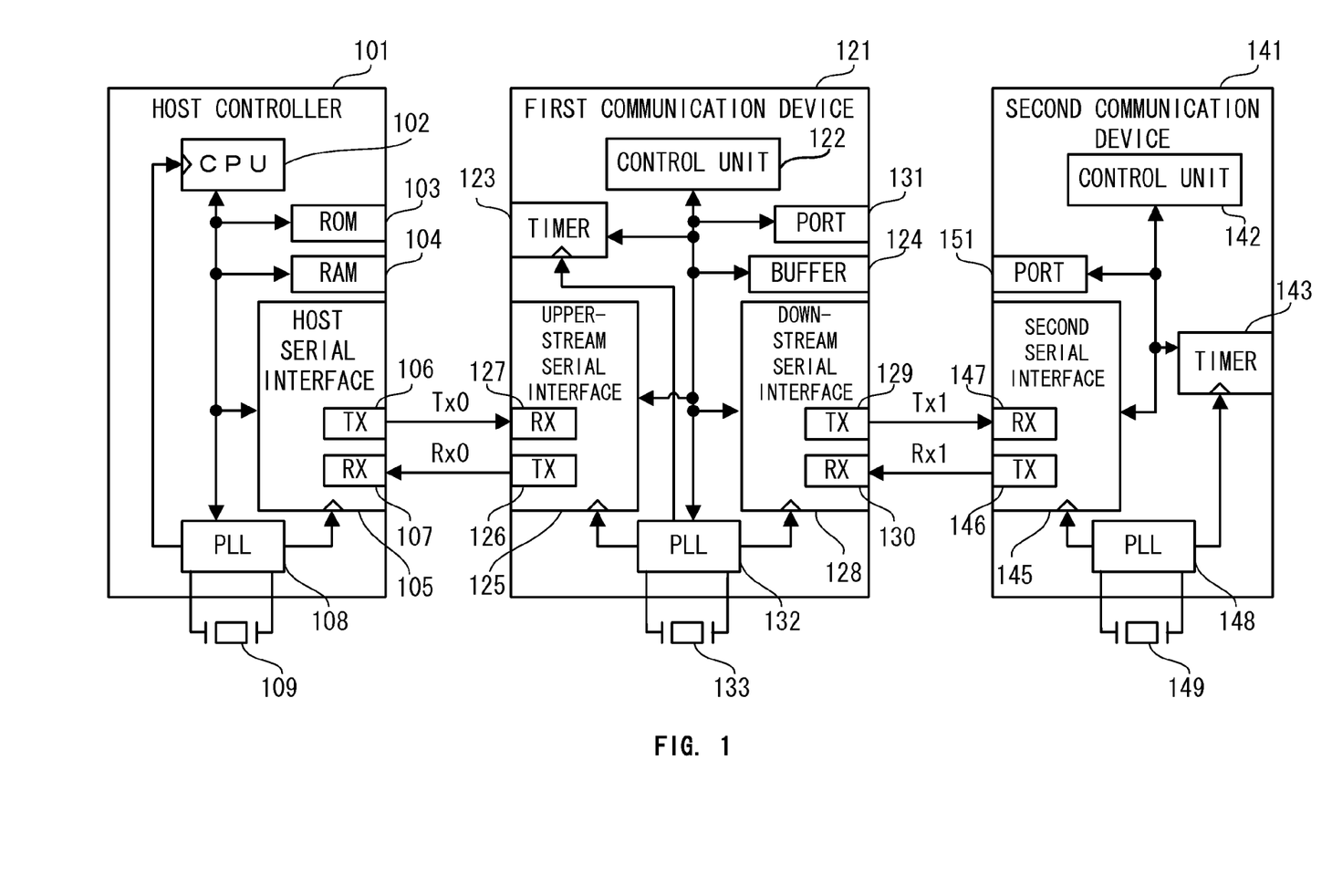
FIG. 1 is a configuration diagram of an electronic system according to an embodiment.

FIG. 1 is a configuration diagram of an electronic system configured by using a host controller exemplifying an electronic device according to this embodiment, in which data is transmitted/received through a serial communication channel.

In the electronic system, a first communication device 121 and a second communication device 141, which can transmit/receive data through serial communications, are connected in series to a host controller 101. The host controller 101 is an operation subject that issues various instructions to the first communication device 121 and the second communication device 141. The first communication device 121 and the second communication device 141 are also examples of the electronic device. A packet is used as the data transmitted/received between the host controller 101 and the first communication device 121 and the second communication device 141. Note that, at least three communication devices may be connected in series to the host controller 101.

The host controller 101 includes a central processing unit (CPU) 102 for controlling an overall operation thereof. The CPU 102 reads commands from a read only memory (ROM) 103, successively executes the commands, and saves execution results thereof to a random access memory (RAM) 104. Further, the host controller 101 is allowed to perform the serial communications to/from the first communication device 121 by a host serial interface 105.

The host serial interface 105 is a full-duplex start-stop synchronization serial interface. The host serial interface 105 transmits transmission data written by the CPU 102 from a transmission port 106 bit by bit through an internal shift register. A start bit, a parity bit, and a stop bit are added before and after a transmission bit string.

In a case where data is received from the first communication device 121, the received data is sampled bit by bit by a reception port 107. Further, the CPU 102 is notified that the received data of one byte has been received through the internal shift register. By reading the data received by the host serial interface 105, the CPU 102 can acquire the data from the first communication device 121. The CPU 102 saves the read data to the RAM 104.

The CPU 102 and the host serial interface 105 operate in response to a clock signal supplied from a phase locked loop (PLL) circuit 108. In particular, the host serial interface 105 communicates to/from the first communication device 121 with a communication frequency corresponding to the frequency of the clock signal. The PLL circuit 108 generates the clock signal from an output signal of, for example, 10 [MHz] output from an externally-connected crystal oscillator 109, based on a multiplication factor and a frequency dividing rate that are defined in advance. The host serial interface 105 communicates to/from the first communication device 121 at the communication speed corresponding to the frequency of the clock signal.

The first communication device 121 includes a control unit 122, a timer 123, an upper-stream serial interface 125, a down-stream serial interface 128, a buffer 124, a port 131, and a PLL circuit 132. The first communication device 121 relays communication between the host controller 101 and the second communication device 141.

The PLL circuit 132 generates the clock signal from the output signal of, for example, 10 [MHz] output from an externally-connected crystal oscillator 133, based on the multiplication factor and frequency dividing rate that are defined in advance. The clock signal is supplied to the upper-stream serial interface 125 and the down-stream serial interface 128. Further, the PLL circuit 132 generates an internal clock signal within the first communication device 121, and supplies the internal clock signal to the control unit 122 and the timer 123.

The upper-stream serial interface 125 includes an upper-stream transmission port 126 and an upper-stream reception port 127, and transmits/receives data to/from the host controller 101. The upper-stream serial interface 125 is a full-duplex start-stop synchronization serial interface in the same manner as the host serial interface 105 of the host controller 101. The upper-stream serial interface 125 communicates to/from the host controller 101 at the communication speed corresponding to the frequency of the clock signal supplied from the PLL circuit 132.

The down-stream serial interface 128 is connected to the second communication device 141 by a two-wire serial signal line, and performs full-duplex serial communications to/from the second communication device 141. The down-stream serial interface 128 includes a down-stream transmission port 129 and a down-stream reception port 130. The down-stream serial interface 128 transmits data to the second communication device 141 by the down-stream transmission port 129. Further, the down-stream serial interface 128 receives data from the second communication device 141 by the down-stream reception port 130. The down-stream serial interface 128 communicates to/from the second communication device 141 at the communication speed corresponding to the frequency of the clock signal supplied from the PLL circuit 132.

The port 131 is an I/O port capable of acquiring an output of a logic to the upper-stream transmission port 126 and the down-stream transmission port 129 and a voltage state in a binary manner. The timer 123 issues a transmission request to the control unit 122 at predetermined time intervals, for example, every 2 milliseconds. The timer 123 operates based on an internal clock signal.

The control unit 122 monitors communication situations of the upper-stream serial interface 125 and the down-stream serial interface 128. The control unit 122 generates data to be transmitted to the host controller 101. Therefore, the generated data includes information for designating the host controller 101 as a transmission destination. The control unit 122 transmits the generated data to the host controller 101 via the upper-stream serial interface 125 in response to the transmission request received from the timer 123. The control unit 122 decodes the data received by the down-stream serial interface 128, and performs processing such as returning of data from the port 131 and outputting of a desired logic to the port 131.

The buffer 124 is a line buffer in which the data received by the down-stream serial interface 128 is temporarily accumulated. The received data is accumulated in the buffer 124 if the upper-stream serial interface 125 is transmitting data to the host controller 101 when the down-stream serial interface 128 receives data addressed to the host controller 101 from the second communication device 141. If the upper-stream serial interface 125 is not transmitting data to the host controller 101 when the down-stream serial interface 128 receives data addressed to the host controller 101 from the second communication device 141, on the other hand, the received data is sent from the down-stream serial interface 128 to the upper-stream serial interface 125 as it is without being accumulated in the buffer 124. Further, the buffer 124 is not used to accumulate the data received by the upper-stream serial interface 125.

The second communication device 141 is connected to the first communication device 121 by the two-wire serial signal line. The second communication device 141 includes a control unit 142, a timer 143, a port 151, a second serial interface 145, and a PLL circuit 148. The second communication device 141 communicates with the host controller 101 through the first communication device 121.

The PLL circuit 148 generates the clock signal from the output signal of, for example, 10 [MHz] output from an externally-connected crystal oscillator 149, based on the multiplication factor and frequency dividing rate that are defined in advance. The clock signal is supplied to the second serial interface 145. Further, the PLL circuit 148 generates an internal clock signal within the second communication device 141, and supplies the internal clock signal to the control unit 142 and the timer 143.

The port 151 is an I/O port capable of acquiring an output of a logic to a transmission port 146 of the second serial interface 145 and a voltage state in a binary manner. The timer 143 issues a transmission request to the control unit 142 at predetermined time intervals, for example, every 2 milliseconds. The timer 143 operates based on an internal clock signal.

The control unit 142 operates in accordance with the data transmitted from the host controller 101. Further, the control unit 142 generates data to be transmitted to the host controller 101. Therefore, the generated data includes information for designating the host controller 101 as the transmission destination. The control unit 142 transmits the generated data to, for example, the host controller 101 via the second serial interface 145 in response to the transmission request received from the timer 143. Further, the control unit 142 decodes the data received by the second serial interface 145, and performs processing such as returning of data from the port 151 and outputting of a desired logic to the port 151.

The second serial interface 145 includes the transmission port 146 and a reception port 147, and can transmit/receive data to/from the first communication device 121. The second serial interface 145 is a full-duplex start-stop synchronization serial interface in the same manner as the host serial interface 105 of the host controller 101. The second serial interface 145 communicates to/from the first communication device 121 at the communication speed corresponding to the frequency of the clock signal supplied from the PLL circuit 148.

Figure 2:
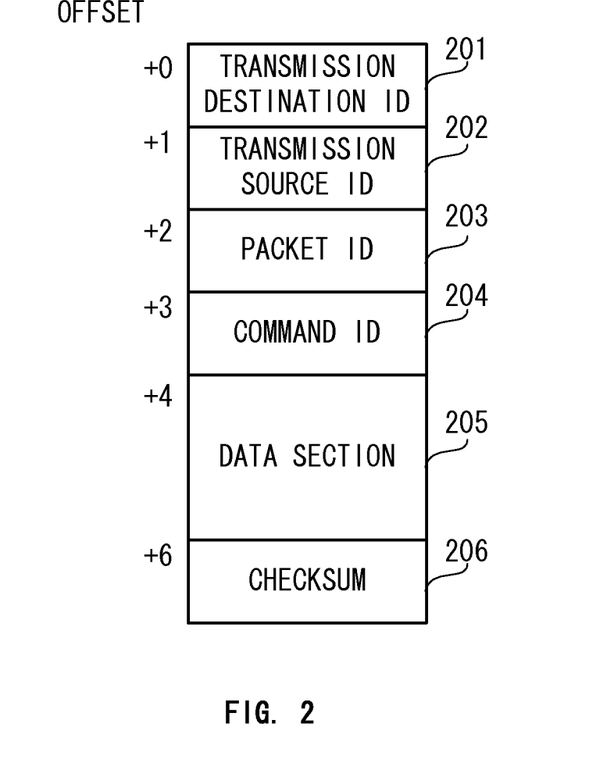
FIG. 2 is a diagram exemplifying a data structure of a packet.

FIG. 2 is a diagram exemplifying a data structure of the packet being the data transmitted/received through the serial communication channel between the host controller 101, the first communication device 121, and the second communication device 141.

Figure 3:
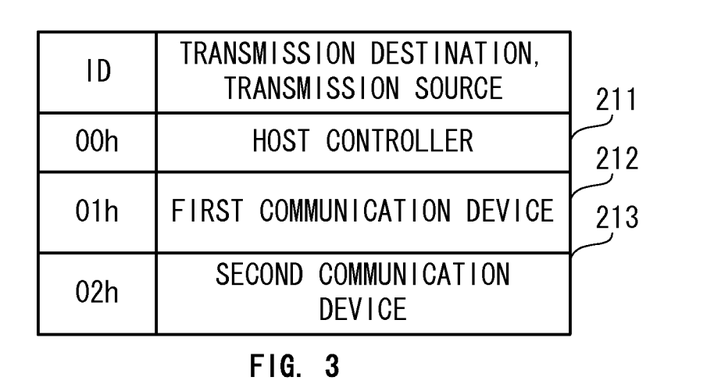
FIG. 3 is a diagram exemplifying a transmission destination ID.

The packet includes in a head thereof a transmission destination ID 201 being a value indicating the destination of the packet. FIG. 3 is a diagram exemplifying a transmission destination ID. In this example, "00h", "01h", and "02h" are set as the transmission destination ID 201 in cases where the packet is addressed to the host controller 101, the first communication device 121, and the second communication device 141, respectively. The transmission destination ID 201 is followed by a transmission source ID 202. The transmission source ID 202 is a value indicating a transmission source of the packet. The value of the same type as the transmission destination ID 201 is used for the transmission source ID 202.

The packet includes a packet ID 203 following the transmission source ID 202. The packet ID 203 is a sequence number assigned to each packet transmitted by each of the host controller 101 and the first communication device 121 and the second communication device 141. Each time each of the host controller 101 and the first communication device 121 and the second communication device 141 transmits one packet, the sequence number of the packet ID 203 is incremented by one. On a receiving end, a packet loss can be detected based on the packet ID 203.

Figure 4:
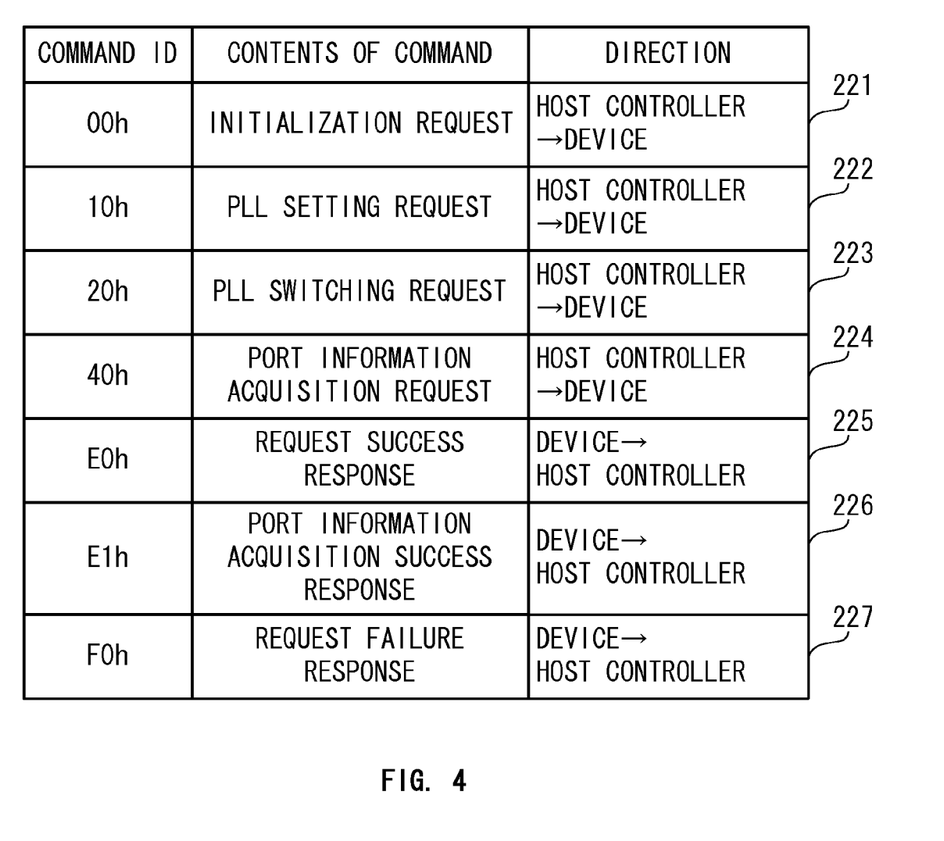
FIG. 4 is a diagram exemplifying a command ID.

The packet includes a command ID 204 following the packet ID 203. The command ID 204 indicates contents of an instruction. FIG. 4 exemplifies the contents of the command ID 204. For example, in a case where the host controller 101 instructs the first communication device 121 or the second communication device 141 to set the PLL circuit 132 or 148, respectively, the command ID 204 becomes "10h" indicating a PLL setting request. The "PLL setting request" is a command for setting the frequency of the clock signal generated by the PLL circuit 132 or 148 to a predetermined frequency. In a case where the host controller 101 instructs the first communication device 121 or the second communication device 141 to switch the setting of the PLL circuit 132 or 148, respectively, the command ID 204 becomes "20h" indicating a PLL switching request. In response to the "PLL switching request", the PLL circuit 132 or 148 starts operating to output the clock signal. In a case where the first communication device 121 or the second communication device 141 transmits a response to the host controller 101, the command ID 204 becomes "E0h" indicating a request success response. The "request success response" is a response command for notifying the host controller 101 that the packet transmitted therefrom has been received by the first communication device 121 or the second communication device 141 without an error.

The packet includes a data section 205 following the command ID 204. The data section 205 includes, for example, PLL setting information including the multiplication factor and a value of the frequency dividing rate of the PLL circuits 132 and 148 in a case where the command ID 204 of "10h" transmits the PLL setting request. The PLL setting information is a fixed value determined in advance at a time of design based on a wire length and transmitted/received contents between the host controller 101, and the first communication device 121 and the second communication device 141, in order to determine the communication frequency therebetween.

The packet includes a checksum 206 following the data section 205. The checksum 206 is a value used for packet error detection.

(Processing for Switching Communication Speed)

In the electronic system as described above, at a startup, the host controller 101 and the first communication device 121 and the second communication device 141 perform communications at a communication speed of, for example, 9,600 [bps]. This is a value obtained by frequency-dividing the output signal of 10 [MHz] from the crystal oscillator 109, 133, or 149 with 1/1,024 being a default value of the frequency dividing rate. This communication speed is a minimum communication speed at which communications are allowed in the electronic system. After the communications are established at such a low speed, the multiplication factor and the frequency dividing rate are set to, for example, eight times and 1/320, respectively, and a communication speed is switched to 250 [kbps], to perform the communications at a higher speed. The switched communication speed is the fixed value determined in advance at the time of design based on the wire length and the transmitted/received contents between the host controller 101 and the first communication device 121 or the second communication device 141 as a communication counterpart as described above. This fixed value is stored in the ROM 103 or the RAM 104 of the host controller 101, and is read as the need arises. Processing performed after the communications are established at a low speed is described below.

(Processing Performed by Host Controller)

Figure 5:
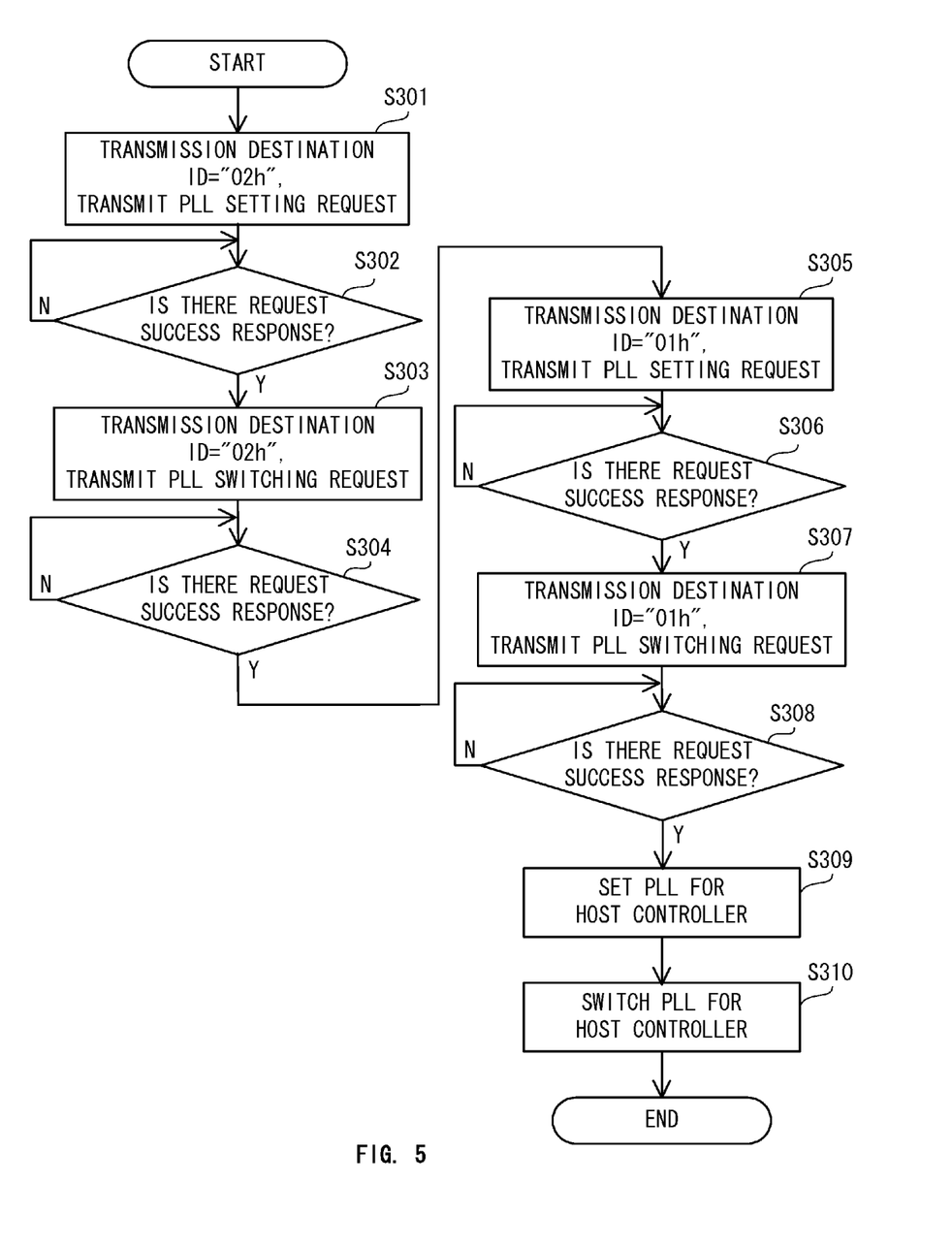
FIG. 5 is a flowchart of processing for switching a communication speed performed by a host controller.

FIG. 5 is a flowchart of processing for switching the communication speed by switching the settings and operations of the PLL circuits 132 and 148 of the first communication device 121 and the second communication device 141, respectively, which is performed by the host controller 101. In the following description, "S" denotes a processing step.

In control for switching the communication speed, the host controller 101 first performs processing for switching the PLL for the second communication device 141. To that end, the CPU 102 of the host controller 101 transmits the packet indicating the PLL setting request to the second communication device 141 (S301). In this packet indicating the PLL setting request, the transmission destination ID 201 is set to "02h", and the command ID 204 is set to "10h". Further, the data section 205 includes the PLL setting information. This packet indicating the PLL setting request is transmitted from the host serial interface 105 to the first communication device 121. The first communication device 121 forwards the received packet indicating the PLL setting request to the second communication device 141. The second communication device 141 returns the packet indicating that the request is successful in response to the PLL setting request. In this packet indicating that the request is successful, the transmission destination ID 201 is set to "00h", and the command ID 204 is set to "E0h".

The host controller 101 stands by until the packet indicating that the request is successful is received from the second communication device 141 (S302). When receiving the packet indicating that the request is successful (S302: Y), the CPU 102 of the host controller 101 transmits the packet indicating PLL switching to the second communication device 141 (S303). In this packet indicating the switching, the transmission destination ID 201 is set to "02h", and the command ID 204 is set to "20h". This packet indicating the switching is also relayed by the first communication device 121 to be transmitted to the second communication device 141.

After transmitting this packet indicating the switching, the host controller 101 stands by until the packet indicating that the request is successful is received from the second communication device 141 in response to the PLL switching request (S304). When the host controller 101 receives the packet indicating that the request is successful (S304: Y), the processing for switching the PLL performed for the second communication device 141 is finished.

After the processing for switching the PLL performed for the second communication device 141 is finished, the host controller 101 performs the processing for switching the PLL for the first communication device 121. The CPU 102 of the host controller 101 transmits the packet indicating the PLL setting request to the first communication device 121 (S305). In this packet indicating the PLL setting request, the transmission destination ID 201 is set to "01h", and the command ID 204 is set to "10h". Further, the data section 205 includes the PLL setting information. The PLL setting information has the same contents as those transmitted to the second communication device 141. This packet indicating the PLL setting request is transmitted from the host controller 101 to the first communication device 121. The first communication device 121 returns the packet indicating that the request is successful in response to the PLL setting request. In this packet indicating that the request is successful, the transmission destination ID 201 is set to "00h", and the command ID 204 is set to "E0h".

The host controller 101 stands by until the packet indicating that the request is successful is received from the first communication device 121 (S306). When receiving the packet indicating that the request is successful (S306: Y), the CPU 102 of the host controller 101 transmits the packet indicating the PLL switching to the first communication device 121 (S307). In this packet indicating the PLL switching, the transmission destination ID 201 is set to "01h", and the command ID 204 is set to "20h". This packet is also transmitted from the host serial interface 105 to the first communication device 121.

After transmitting the packet indicating the PLL switching, the host controller 101 stands by until the packet indicating that the request is successful is received from the first communication device 121 in response to the PLL switching request (S308). When the host controller 101 receives the packet indicating that the request is successful (S308: Y), the processing for switching the PLL performed for the first communication device 121 is finished. The contents of the PLL setting information are the same, and hence the communication speeds of the first communication device 121 and the second communication device 141 are the same. Therefore, at this point in time, the first communication device 121 and the second communication device 141 can communicate to/from each other at the communication speed obtained after the switching.

After the processing for switching the PLL performed for the first communication device 121 is finished, the host controller 101 sets the PLL for the CPU 102 (S309). Subsequently, the host controller 101 switches the PLL for the CPU 102 (S310). The communication speed of the host controller 101 is also set to be the same as those of the first communication device 121 and the second communication device 141.

The PLL circuits 108, 132, and 148 generate the respective clock signals based on the multiplication factor and the frequency dividing rate corresponding to the PLL setting information. This allows the communication speed of the entire electronic system to be changed.

(Processing Performed by First Communication Device)

Figure 6:
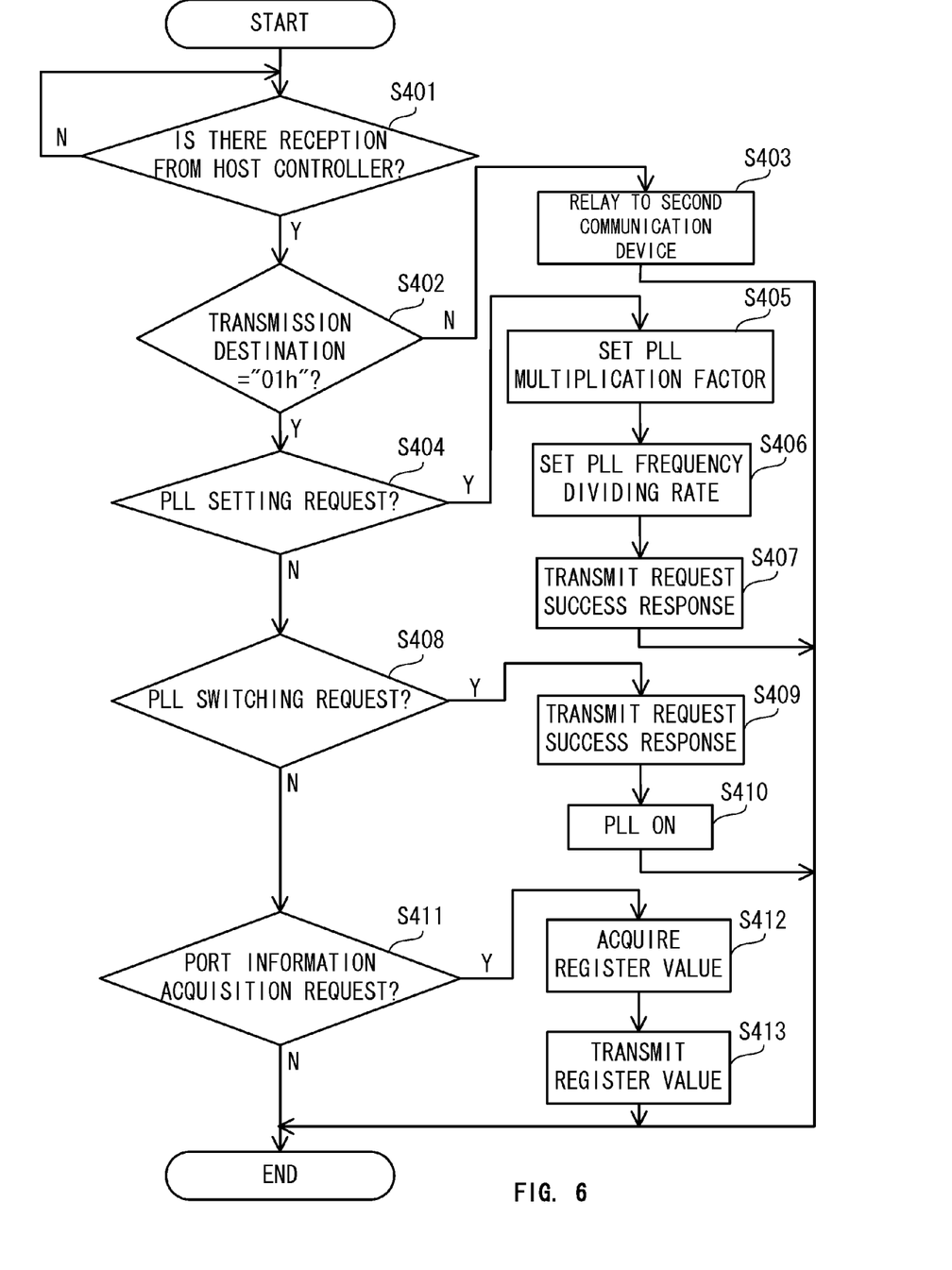
FIG. 6 is a flowchart of the processing for switching the communication speed performed by a first communication device.

FIG. 6 is a flowchart of processing performed by the first communication device 121 in response to the above-mentioned processing performed by the host controller 101.

The control unit 122 of the first communication device 121 is in a standby state until the packet is received from the host controller 101 (S401). When receiving the packet from the host controller 101, the control unit 122 first examines whether or not the packet is addressed to itself based on the transmission destination ID 201 of the packet (S402). When the packet is not addressed to itself, the control unit 122 transmits the packet to the second communication device 141, and finishes the processing (S402: N and S403). This processing is performed for the packet transmitted from the host controller 101 in Steps S301 and S303 of FIG. 5.

When the packet is addressed to itself, the control unit 122 examines whether or not the packet is the PLL setting request based on the command ID 204 (S402: Y and S404). When the packet is the PLL setting request, the control unit 122 sets the multiplication factor and frequency dividing rate of the PLL circuit 132 based on the PLL setting information included in the data section 205 of the packet (S404: Y, S405, and S406). After finishing the setting of the multiplication factor and frequency dividing rate of the PLL circuit 132, the control unit 122 generates the packet indicating that the PLL setting request is successful, transmits the packet to the host controller 101, and finishes the processing (S407). This processing is performed for the packet transmitted from the host controller 101 in Step S305 of FIG. 5. The packet indicating that the PLL setting request is successful is transmitted to the host controller 101 after the setting of the multiplication factor and frequency dividing rate of the PLL circuit 132 is finished. With this configuration, it is possible to positively set the multiplication factor and frequency dividing rate.

When the packet is not the PLL setting request, the control unit 122 examines whether or not the command ID 204 of the packet is the PLL switching request (S404: N and S408). When the packet is the PLL switching request, the control unit 122 generates the packet indicating that the PLL switching request is successful, and transmits the packet to the host controller 101 (S408: Y and S409). After transmitting the packet indicating that the PLL switching request is successful to the host controller 101, the control unit 122 operates the PLL circuit 132 with the multiplication factor and frequency dividing rate set in Steps S405 and S406, and finishes the processing (S410). This processing is performed for the packet transmitted from the host controller 101 in Step S307 of FIG. 5.

Through the above-mentioned processing, the first communication device 121 is allowed to communicate at the communication speed corresponding to the clock signal having the frequency instructed of by the host controller 101.

When the packet is not the PLL switching request, the control unit 122 examines whether or not the command ID 204 of the packet is a request for acquisition of port information (S408: N and S411). When the packet is the request for the acquisition of the port information, the control unit 122 acquires a register value of the port 131 (S411: Y and S412). The control unit 122 generates the packet indicating an acquisition success response for the port information including the acquired register value, transmits the packet to the host controller 101, and finishes the processing (S413).

When the packet is not the request for the acquisition of the port information, the control unit 122 finishes the processing (S411: N).

(Processing Performed by Second Communication Device)

Figure 7:
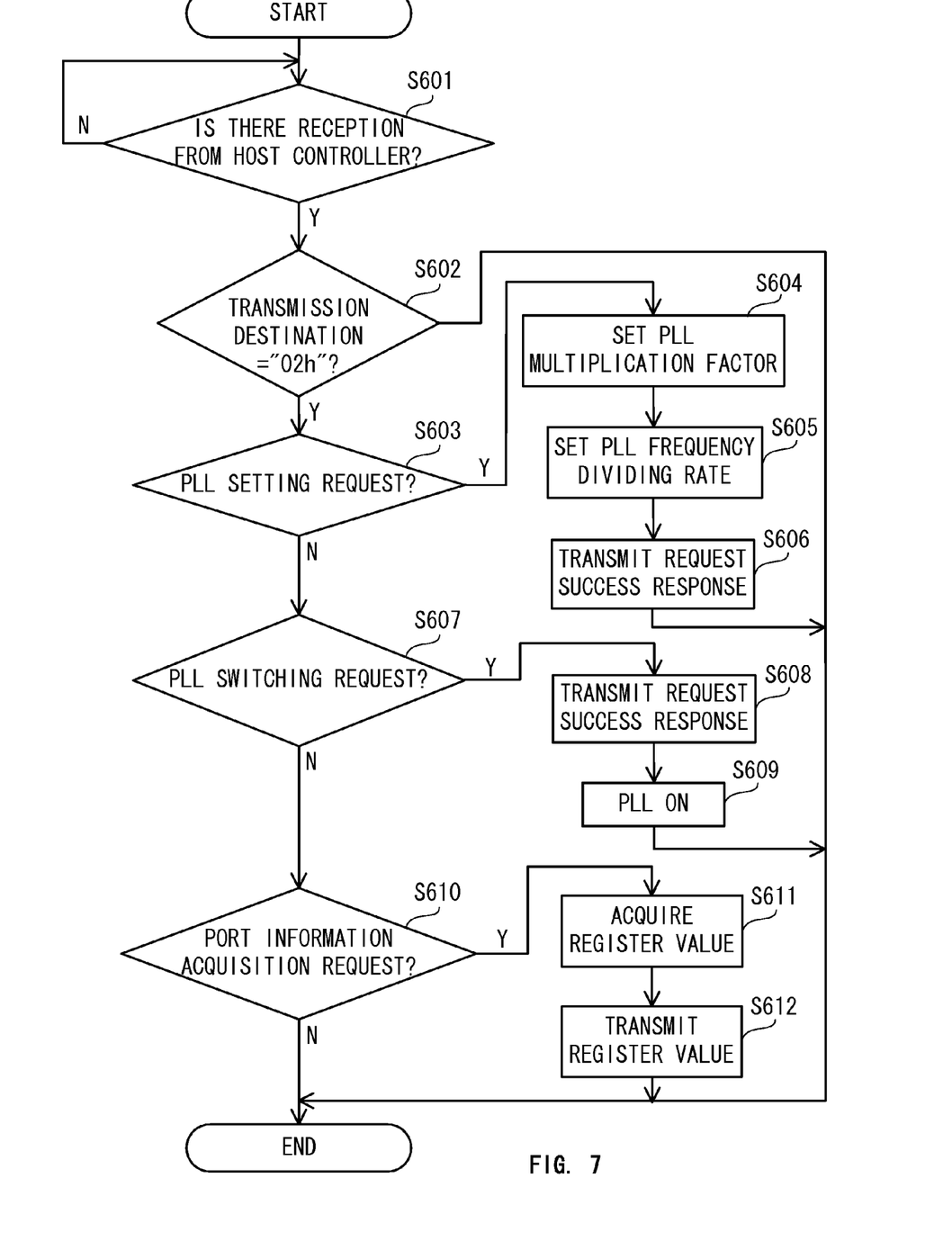
FIG. 7 is a flowchart of the processing for switching the communication speed performed by a second communication device.

FIG. 7 is a flowchart of processing performed by the second communication device 141 in response to the above-mentioned processing performed host controller 101.

The control unit 142 of the second communication device 141 is in a standby state until the packet transmitted from the host controller 101 is received via the first communication device 121 (S601). When receiving the packet transmitted from the host controller 101, the control unit 142 first examines whether or not the packet is addressed to itself based on the transmission destination ID 201 of the packet (S602). When the packet is not addressed to itself, the control unit 142 finishes the processing (S602: N).

When the packet is addressed to itself, the control unit 142 examines whether or not the command ID 204 of the packet is the PLL setting request based on the command ID 204(S602: Y and S603). When the packet is the PLL setting request, the control unit 142 sets the multiplication factor and frequency dividing rate of the PLL circuit 148 based on the PLL setting information included in the data section 205 of the packet (S603: Y, 5604, and S605). After finishing the setting of the multiplication factor and frequency dividing rate of the PLL circuit 148, the control unit 142 generates the packet indicating that the PLL setting request is successful, transmits the packet to the host controller 101, and finishes the processing (S606). This processing is performed for the packet transmitted from the host controller 101 in Step S301 of FIG. 5.

The packet indicating that the PLL setting request is successful is transmitted to the host controller 101 after the setting of the multiplication factor and frequency dividing rate of the PLL circuit 148 is finished. With this configuration, it is possible to positively set the multiplication factor and frequency dividing rate.

When the packet is not the PLL setting request, the control unit 142 examines whether or not the command ID 204 of the packet is the PLL switching request (S603: N and S607). When the packet is the PLL switching request, the control unit 142 generates the packet indicating that the PLL switching request is successful, and transmits the packet to the host controller 101 (S607: Y and S608). After transmitting the packet indicating that the PLL switching request is successful to the host controller 101, the control unit 142 operates the PLL circuit 148 with the multiplication factor and frequency dividing rate set in Steps S604 and S605, and finishes the processing (S609). This processing is performed for the packet transmitted from the host controller 101 in Step S303 of FIG. 5.

In order to transmit the packet indicating that the PLL switching request is successful to the host controller 101, the first communication device 121 and the second communication device 141 need to be operating at the same communication speed. Therefore, in this embodiment, in this manner, the packet indicating that the PLL switching request is successful is transmitted to the host controller 101 in response to the PLL switching request before the PLL circuit 148 is operated with the multiplication factor and frequency dividing rate set by the control unit 142.

Through the above-mentioned processing, the second communication device 141 is allowed to communicate at the communication speed corresponding to the clock signal having the frequency instructed of by the host controller 101.

When the packet is not the PLL switching request, the control unit 142 examines whether or not the command ID 204 of the packet is a request for acquisition of port information (S607: N and S610). When the packet is the request for the acquisition of the port information, the control unit 142 acquires a register value of the port 151 (S610: Y and S611). The control unit 142 generates the packet indicating an acquisition success response for the port information including the acquired register value, transmits the packet to the host controller 101, and finishes the processing (S612).

When the packet is not the request for the acquisition of the port information, the control unit 142 finishes the processing (S610: N).

(Timings to Transmit/Receive Packet Among Host Controller, First Communication Device, and Second Communication Device)

Figure 8:
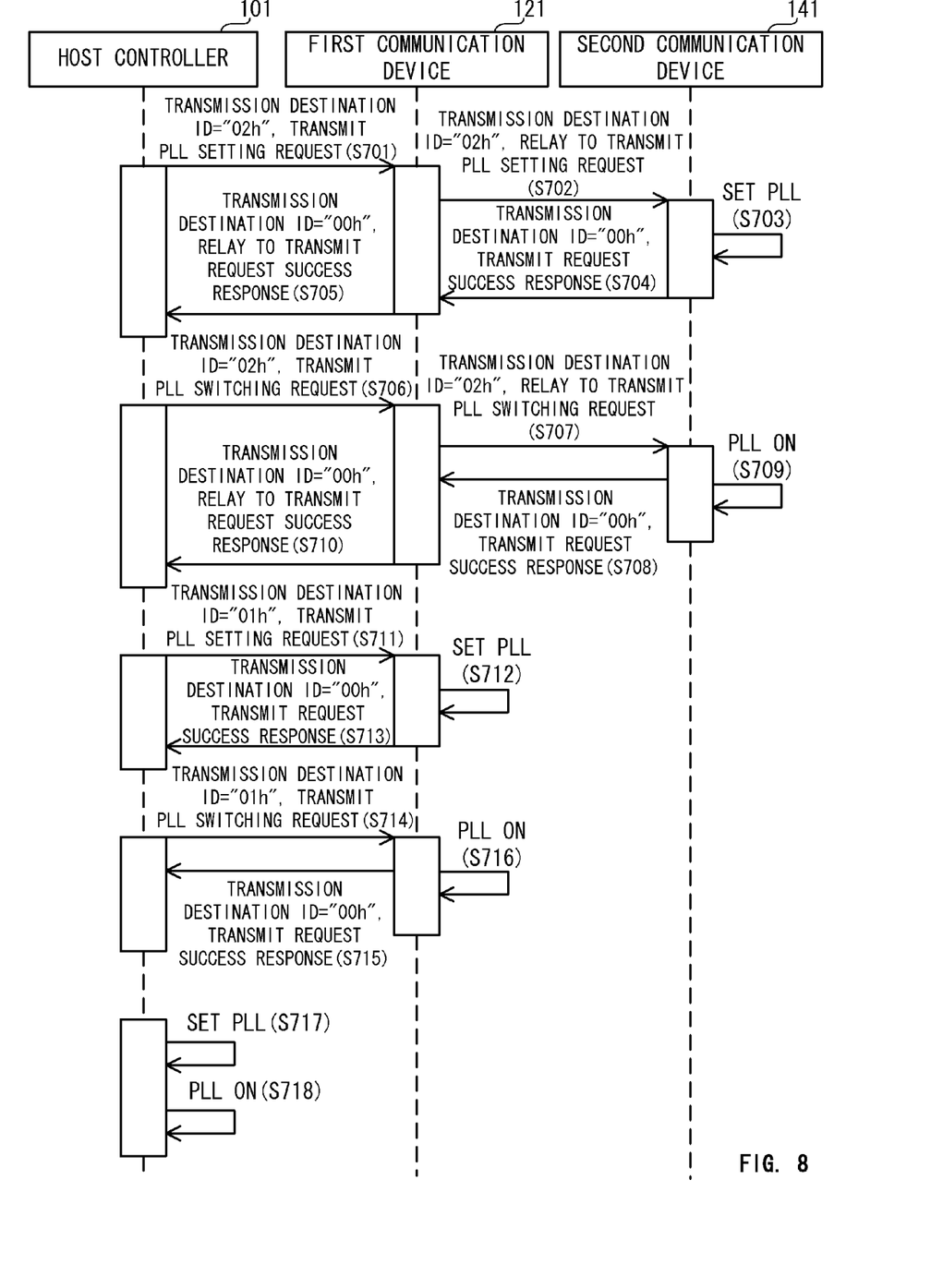
FIG. 8 is an explanatory diagram of processing performed by the host controller, the first communication device, and the second communication device, and timings to transmit/receive the packet.

FIG. 8 is a diagram illustrating processing respectively performed by the host controller 101, the first communication device 121, and the second communication device 141, and timings to transmit/receive the packet. The host controller 101 first switches the communication speed of the second communication device 141. After that, the host controller 101 switches the communication speed of the first communication device 121 to the same communication speed as that of the second communication device 141.

The host controller 101 transmits the packet indicating the PLL setting request addressed to the second communication device 141 to the first communication device 121 (S701). The first communication device 121 receives this packet. Because the received packet is not addressed to itself, the first communication device 121 relays to transmit the received packet to the second communication device 141 (S702). The second communication device 141 receives the packet, and sets the multiplication factor and frequency dividing rate of the PLL circuit 148 based on the contents of the packet (S703). After the setting, the second communication device 141 transmits the packet indicating that the setting in response to the PLL setting request is successful to the first communication device 121 (S704). The first communication device 121 receives this packet. Because the received packet is not addressed to itself, the first communication device 121 relays to transmit the received packet to the host controller 101 (S705).

The host controller 101 that has received packet indicating that the setting in response to the PLL setting request is successful transmits the packet indicating the PLL switching request addressed to the second communication device 141 to the first communication device 121 (S706). The first communication device 121 receives this packet. Because the received packet is not addressed to itself, the first communication device 121 relays to transmit the received packet to the second communication device 141 (S707). The second communication device 141 receives the packet, and transmits the packet indicating that the PLL switching request is successful to the first communication device 121 (S708). After the transmission, the second communication device 141 operates the PLL circuit 148 with the multiplication factor and frequency dividing rate set in Step S703 (S709). The first communication device 121 receives this packet. Because the received packet is not addressed to itself, the first communication device 121 relays to transmit the received packet to the host controller 101 (S710).

Through the above-mentioned processing, the frequency of the clock signal generated by the PLL circuit 148 of the second communication device 141 is changed, and the communication speed of the second communication device 141 is switched.

The host controller 101 that has received the packet indicating that the PLL switching request is successful from the second communication device 141 then switches the communication speed of the first communication device 121.

The host controller 101 transmits the packet indicating the PLL setting request addressed to the first communication device 121 to the first communication device 121 (S711). The first communication device 121 receives this packet. Because the received packet is addressed to itself, the first communication device 121 sets the multiplication factor and frequency dividing rate of the PLL circuit 132 based on the contents of this packet (S712). After the setting, the first communication device 121 transmits the packet indicating that the setting in response to the PLL setting request is successful to the host controller 101 (S713).

The host controller 101 that has received the packet indicating that the setting in response to the PLL setting request is successful transmits the packet indicating the PLL switching request addressed to the first communication device 121 to the first communication device 121 (S714). The first communication device 121 receives this packet. Because the received packet is addressed to itself, the first communication device 121 transmits the packet indicating that the PLL switching request is successful to the host controller 101 (S715). After the transmission, the first communication device 121 operates the PLL circuit 132 with the multiplication factor and frequency dividing rate set in Step S712 (S716).

Through the above-mentioned processing, the frequency of the clock signal generated by the PLL circuit 132 of the first communication device 121 is changed, and the communication speed of the first communication device 121 is switched.

The host controller 101 that has received the packet indicating that the PLL switching request is successful from the first communication device 121 then switches the communication speed of the host controller 101 itself. The CPU 102 of the host controller 101 sets the multiplication factor and frequency dividing rate of the PLL circuit 108, and operate the PLL circuit 108 therewith (S717 and S718). Through this processing, the frequency of the clock signal generated by the PLL circuit 108 of the host controller 101 is changed, and the communication speed of the host controller 101 is switched.

In this manner, dynamic switching for the communication speeds of the host controller 101, the first communication device 121, and the second communication device 141 is completed.

As described above, by switching the communication speeds in order from the second communication device 141, it is possible to dynamically switch the communication speed even after the operation is started. This allows the communications that can be positively established and also exhibit high responsiveness after being established.

Note that, in the above-mentioned embodiment, in order to switch the communication speed, the communications using the two commands of the PLL setting request and the PLL switching request are performed, but only the PLL setting request may be used. In other words, both the setting and the switching may be executed in response to the PLL setting request.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184481, filed Aug. 23, 2012, which is hereby incorporated by reference herein in its entirety.

What is claimed is:

1. An electronic system, comprising:
a first device, a second device, and a third device that are connected in series via communication lines;
a first communication line for connecting the first device to the second device; and
a second communication line for connecting the second device to the third device,
wherein the first device includes
a first clock generator configured to generate a first internal clock,
a first down stream communication interface configured to communicate with the third device via the first communication line and the second communication line based on the first internal clock, and
a first control unit configured to control the first clock generator to control the speed of the first internal clock,
wherein the second device includes
a second clock generator configured to generate a second internal clock,
a first upper stream communication interface configured to communicate with the first device via the first communication line based on the second internal clock,
a second down stream communication interface configured to communicate with the third device via the second communication line based on the second internal clock, and
a second control unit configured to control the second clock generator to control the speed of the second internal clock,
wherein the third device includes
a third clock generator configured to generate a third internal clock,
a second upper stream communication interface configured to communicate with the second device via the second communication line based on the third internal clock, and
a third control unit configured to control the third clock generator to control the speed of the third internal clock,
wherein the first device is configured to:
transmit a first command for changing a communication speed to a first speed to the third device via the second device;
transmit, after the communication speed of the third device is changed, a second command for changing the communication speed to the first speed to the second device; and change, after the communication speed of the second device is changed, using the first control unit, the communication speed of the first device to the first speed, wherein the third control unit is configured to control the third clock generator based on the first command, and the second control unit is configured to control the second clock generator based on the second command.

2. The electronic system according to claim 1, wherein the third device is configured to:

transmit a response based on a fact that the command for changing the communication speed to the first speed has been received to the first device via the second device; and switch, after transmitting the response to the first device, the communication speed to the first speed, wherein the first device is configured to transmit, after receiving the response, the command for changing the communication speed to the first speed to the second device.

3. The electronic system according to claim 1, wherein the first device, the second device, and the third device are configured to set the communication speed to a second speed lower than the first speed at a startup, and wherein the first device is configured to transmit the command for changing the communication speed to the first speed to the third device in communications established at the second speed.

4. The electronic system according to claim 1, wherein the first device, the second device, and the third device each comprise a clock signal generating unit, wherein the clock signal generating unit is configured to generate a clock signal corresponding to the communication speed by multiplying and frequency-dividing a signal having a predetermined frequency.

5. The electronic system according to claim 1, wherein the first communication line and the second communication line each comprise a line for performing serial communications.

6. The electronic system according to claim 1, wherein the command for changing the communication speed to the first speed comprises transmission destination identification information indicating a transmission destination, transmission source identification information, a command for instructing to change speed, and data indicating the first speed.

* * * * *